United States Patent [19]

Forkin et al.

[11] Patent Number: 4,790,477
[45] Date of Patent: Dec. 13, 1988

[54] SOLAR HEATING

[75] Inventors: Mark P. Forkin, Drogheda; Colm Holmes; William Quigley, both of Dublin, all of Ireland

[73] Assignee: Claudius Enterprises Limited, Ireland

[21] Appl. No.: 5,594

[22] Filed: Jan. 21, 1987

[30] Foreign Application Priority Data

Jan. 23, 1986 [IE]  Ireland .................................. 196/86

[51] Int. Cl.[4] .......................................... G05D 23/00
[52] U.S. Cl. ..................................... 237/2 B; 126/435; 126/437; 126/422; 62/238.7; 62/235.1
[58] Field of Search ................. 237/2 B; 126/435, 437, 126/422, 417, 433, 436, 427; 62/235.1, 238.6, 238.7; 165/45, 48 S, 18

[56] References Cited

U.S. PATENT DOCUMENTS

| 2,575,478 | 11/1951 | Wilson | 126/435 |
|---|---|---|---|
| 3,997,108 | 12/1976 | Mason | 126/429 |
| 4,012,920 | 3/1977 | Kirschbaum | 237/2 B |
| 4,066,118 | 1/1978 | Goettl | 237/2 B |
| 4,143,642 | 3/1979 | Beaulieu | 237/2 B |
| 4,202,493 | 5/1980 | Franchina | 237/2 B |
| 4,291,833 | 9/1981 | Franchina | 126/427 |
| 4,406,136 | 9/1983 | Picchiottino | 126/427 |
| 4,438,881 | 3/1984 | Pendergrass | 62/235.1 |
| 4,527,618 | 7/1985 | Fyfe et al. | 237/2 B |

FOREIGN PATENT DOCUMENTS

| 0033756 | 8/1981 | European Pat. Off. . |
|---|---|---|
| 2528429 | 1/1977 | Fed. Rep. of Germany . |
| 2744618 | 4/1978 | Fed. Rep. of Germany . |
| 2636039 | 3/1979 | Fed. Rep. of Germany . |
| 2848530 | 5/1980 | Fed. Rep. of Germany . |
| 2856018 | 7/1980 | Fed. Rep. of Germany . |
| 2411308 | 6/1982 | Fed. Rep. of Germany . |
| 3044684 | 7/1982 | Fed. Rep. of Germany . |
| 3050339 | 12/1982 | Fed. Rep. of Germany . |
| 2394025 | 1/1979 | France . |
| 52-79548 | 4/1977 | Japan . |
| 57-192732 | 11/1982 | Japan . |
| 81/02458 | 9/1981 | PCT Int'l Appl. . |
| 1535026 | 12/1978 | United Kingdom . |
| 2020413 | 11/1979 | United Kingdom . |
| 1571475 | 7/1980 | United Kingdom . |
| 2050704 | 1/1981 | United Kingdom . |

Primary Examiner—James C. Yeung
Attorney, Agent, or Firm—Ostrolenk, Faber, Gerb & Soffen

[57] ABSTRACT

The invention relates to a space heating system comprising an air cooled solar collector, a heat store, air ducting, a forced draught mechanism valves, auxiliary heating means and a control system. According to the invention the auxiliary heating means includes a heat pump. The heat pump and heat store are located in a thermally insulated air-tight housing divided into different regions for the evaporator, condenser and heat store. The heating system is operable in a mode in which it circulates air from the heat store to the heat pump evaporator and back in a closed air-tight circuit while simultaneously circulating air from the heat pump condenser to the space to be heated and back. The arrangement minimizes heat loss and defrosting of the heat pump evaporator. The invention also provides air ducting made from seamless lengths of foamed plastics material and provided with a vapor-proof lining.

11 Claims, 12 Drawing Sheets

SOLAR HEATING

The present invention relates to space heating systems.

In particular the invention relates to a space heating system comprising:
(a) an air cooled solar collector;
(b) a heat store;
(c) air ducting connecting the solar collector to the heat store, and connecting the heat store to the space to be heated;
(d) a forced draught mechanism for driving air about the system;
(e) valves for routing air within the system;
(f) auxiliary heating means for supplementing the heat being delivered to the space to be heated; and
(g) a control system for governing the operation of the forced draught mechanism, valves and auxiliary heating means.

The auxiliary heating means is provided because the rest of the heating system may from time to time fail to meet a heating demand.

PRIOR ART

Various proposals for auxiliary heating means have been made. One proposal that has been made is to use a heat pump. A heat pump should present the advantages of high efficiency as well as cleanliness and ease of operation. However, no satisfactory arrangement for including a heat pump in such a heating system has yet been proposed. One difficulty with the inclusion of a heat pump is that regular defrosting of the heat pump evaporator would reduce the efficiency from its theoretical value. Another difficulty is that the additional ducting involved in including a heat pump would result in further heat loss through the material of the ducting or heat leakage through seams or joints in the ducting.

SUMMARY OF THE INVENTION

An object of the present invention is to provide an improved space heating system of the type described in which the auxiliary heating means is a heat pump so arranged in the system as to overcome the above-mentioned disadvantages.

The invention provides a space heating system of the type described wherein the auxiliary heating means includes a heat pump, and wherein the heat pump and heat store are located in a thermally insulated air-tight housing having outlet and inlet ports for air flow along the air ducting to and from the solar collector and outlet and inlet ports for air flow along the air ducting to and from the space to be heated, the housing being divided into a heat pump evaporator region, a heat pump condenser region, and a heat store region, the heating system being operable in a mode in which it circulates air from the heat store to the heat pump evaporator and back to the heat store in a closed air-tight circuit while simultaneously circulating air from the heat pump condenser to the space to be heated and back to the heat pump condenser in a separate air circuit.

The arrangement presents a number of advantages over previously proposed arrangements. Firstly, because the heat pump evaporator is operated only as part of a closed air-tight circuit the same charge of air is repeatedly circulated to the evaporator so that frosting over of the evaporator is eliminated or at least substantially reduced relative to that which would arise if fresh air were being introduced into the circuit. Secondly, because the heat pump and heat store are contained within the same thermally insulated air-tight housing very little thermal losses or air leakage take place. Furthermore, at least some of if any loss or leakage takes place from one region within the housing to another, so that the heat is not lost to the heating system. Similarly, heat generated by the heat pump condenser is also retained within the system.

Advantageously the auxiliary heating means includes an electric heating unit to supplement the heat pump when a demand for heat exceeds that which the rest of the heating system and the heat pump combined can deliver. The electric heating unit may also be located in the thermally insulated air-tight housing.

The heating system may include heat exchange means for adding heat to the water in a hot water supply. Thus when the heating system has spare capacity this may be usefully used. The heat exchange means may comprise a thermosiphon for bringing heat to water in a hot water store located at a level above the level of the heat store. The thermosiphon may use as a working fluid a low freezing point liquid such as glycol. Alternatively the thermosiphon may use water as a working fluid in which case it is made of polypropylene to prevent damage on freezing. Alternatively the heating means may consist of a heat pipe.

The heat store may comprise a phase change material. As a result the heat store, which is located in the thermally insulated air-tight housing may hold a relatively large quantity of heat while being of relatively small volume. The phase change material may change phase at a temperature slightly above the temperature which is normally demanded in the space being heated. Alternatively, water may be used as a phase change material.

The air ducting may comprise ducts of relatively large cross-section. Use of such ducts reduces the power consumption of the forced draught mechanism.

The forced draught mechanism may be located in the thermally insulated air-tight housing. In this way any heat generated by the forced draught mechanism is not lost to the heating system.

The thermally insulated air-tight housing may be made from foamed plastics material provided with a vapour-proof lining. This arrangement gives good thermal and air insulation and is relatively easy to work with.

In a second aspect the invention provides air ducting suitable for use in a heating system according to the invention, the ducting being made from seamless lengths of foamed plastics material provided with a vapour-proof lining. As mentioned, this arrangement gives good thermal and air insulation and is relatively easy to work with. Examples of foamed plastics materials which are suitable include polyurethane, phenol-formaldehyde and polyisocyanate. Ducting made from polyurethane allows good jointing between lengths, thereby reducing air leakage into and out of the ducting. The vapour-proof lining may comprise metallic foil. Such a lining also improves thermal insulation. The ducting may be encased in plasterboard as a protection against fire.

BRIEF DESCRIPTION OF THE DRAWINGS

The invention will now be described more particularly with reference to the accompanying drawings which show, by way of example only, a domestic space and hot water heating system according to the invention. In the drawings.

DESCRIPTION OF THE INVENTION

Figure 1A:
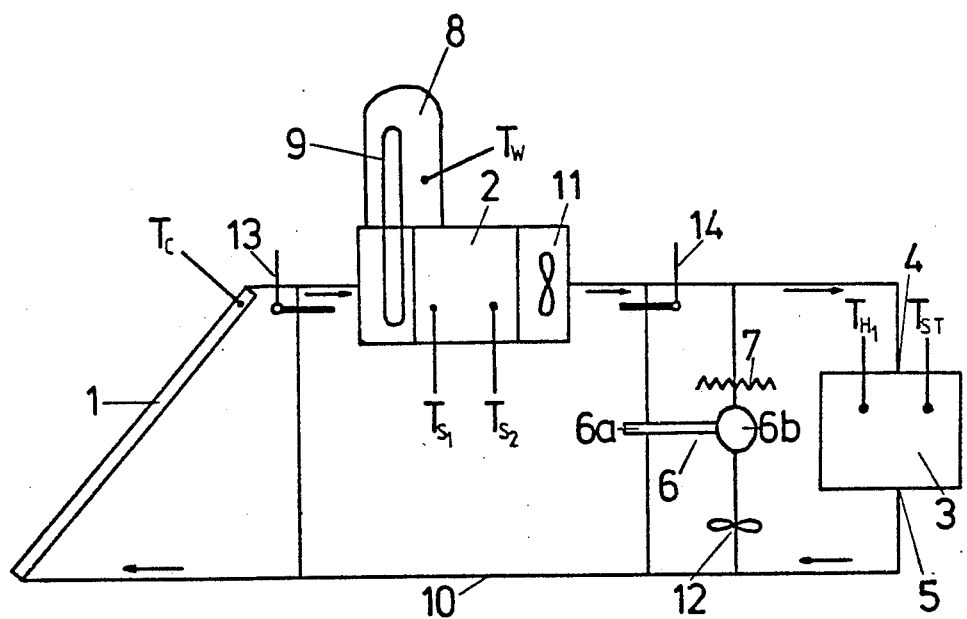
FIGS. 1a to 1j are diagrams of the system operating in each of the ten different modes in which it is capable of operation.

Referring initially to FIGS. 1a to 1j, the heating system comprises: a solar collector 1 from which most of the heat is obtained; a heat store 2; a house 3 to be heated; a warm air delivery port 4; a cool air extraction port 5; an air-to-air heat pump 6 for raising the temperature of air before delivery to the house 3 and constituting one part of the auxiliary heating means; an electric heating unit 7 to supplement the heat pump 6 and constituting the other part of the auxiliary heating means; a hot water tank 8 above the heat store 2; a thermosiphon 9 for heating water in the tank 8; air ducting 10; a first fan 11 and a second fan 12 which together constitute the forced draught mechanism for driving air about the network 10; and a first motorized damper 13 and a second motorized damper 14 which constitute the valves for routing air within the heating system.

The heating system may be operated in any one of ten different modes. The ten modes are described in detail below. A control system (not shown) measures the temperature at various locations within the heating system, such as the temperature $T_c$ of air leaving the solar collector 1, the temperature $T_{s1}$ of air arriving at the heat store 2, the temperature $T_{s2}$ of air leaving the heat store 2, the temperature $T_w$ of water in the hot water tank 8, and the air temperature $T_{H1}$ in the house 3. In response to these measurements, the control system causes the heating system to switch from one mode to another to make best use of the available solar and outdoor ambient energy and to minimise the use of electricity in driving the fans 11, 12, heat pump 6, motorised dampers 13, 14 and electric heating unit 7. In some twenty four hour periods the system may operate in all the different modes whereas in other twenty four hour periods the system may operate in only a small number of the modes.

The various modes will now be described in more detail. Throughout the description it will be assumed that the desired indoor temperature is 20° C. To achieve an indoor temperature of 20° C. it is usual to supply to the house air at a temperature of 28° C. or higher. Supply of air at a lower temperature would have the effect of a draught. The various orientations of the dampers 13, 14 may be noted in each Figure. The arrows indicate air flow, and it will be apparent from these arrows whether either or both of the fans 11, 12 are on in the particular mode.

FIG. 1a shows a first mode in which air is sent from the solar collector 1 to the heat store 2 and thence to the house 3. The air may give up part of its heat to the heat store 2 and part to the house 3. This mode may occur frequently or be the dominant mode when the sun is shining so that solar energy is available, but the outdoor temperature is mild or cool so that space heating is required. The first fan 11 is on. Air leaving the solar collector 1 may be at a temperature in the region of 45° C. to 75° C. Heat may be given up to the thermosiphon 9 and to the heat store 2, depending on the temperatures of the hot water and the heat store. Air leaving the heat store 2 is typically at the phase change temperature of the heat store, that is to say 31° C., but may be at a higher temperature. Air at 20° C. is extracted from the house 3 and returned to the solar collector 1.

Figure 1B:
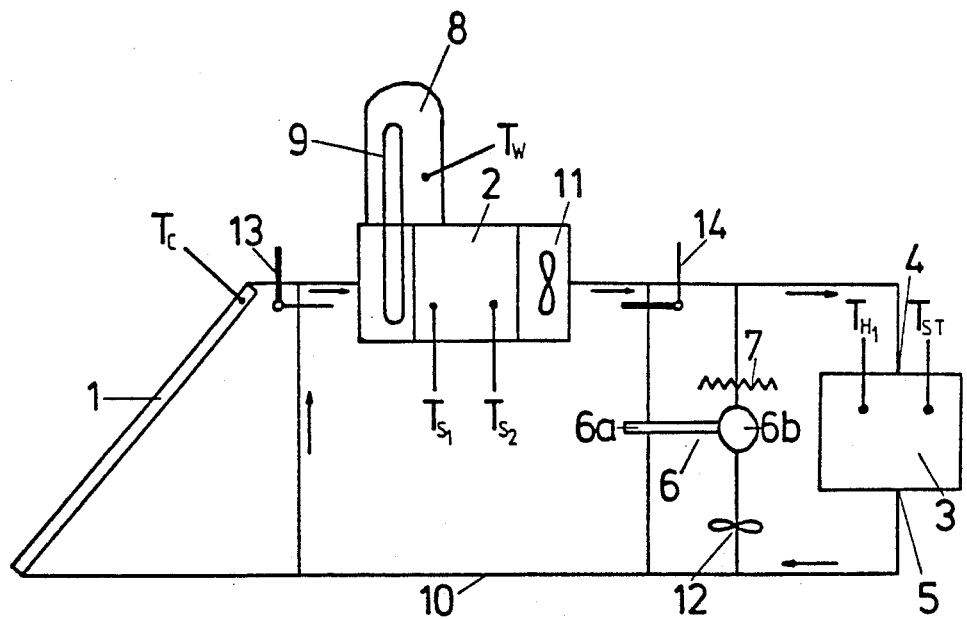

FIG. 1b shows a second mode, in which air is sent from the heat store 2 to the house 3. This mode may occur frequently or be dominant at night after a sunny day, when there is no longer solar energy available, when space heating is required, and when the store 2 contains sufficient heat to heat the house 3.

Figure 1C:
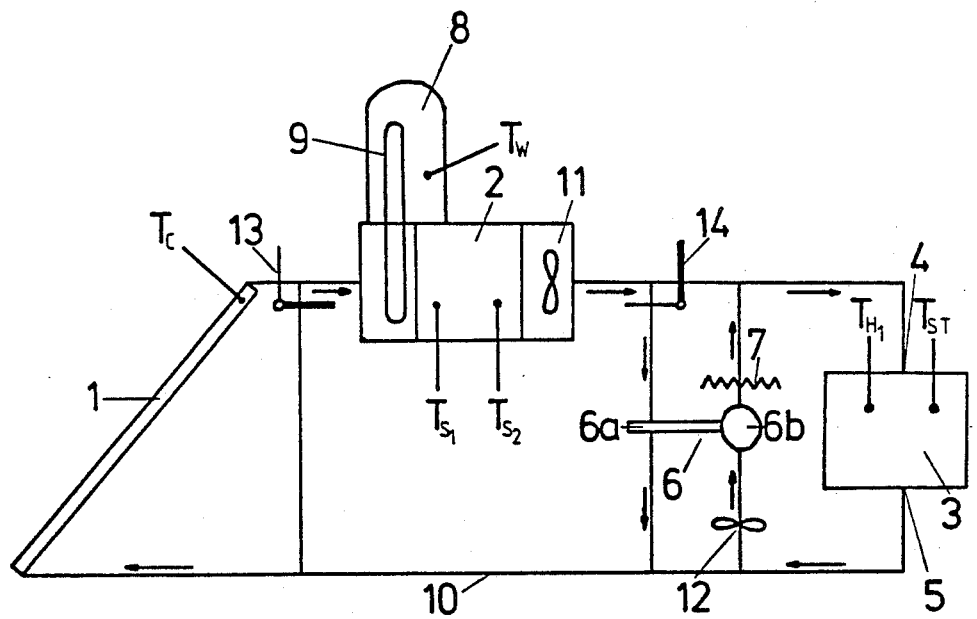

FIG. 1c shows a third mode in which air is sent from the solar collector 1 to the heat store 2 and on to the heat pump evaporator 6a, and in which air is simultaneously sent from the heat pump condensor 6b to the house 3. The air from the solar collector 1 may yield up part of its heat to the heat store 2 and part to the heat pump evaporator 6a. This mode may occur frequently or be the dominant mode on a dull day or at night in Winter. Space heating is required but very little or no solar energy is available. It is nevertheless possible to obtain useful energy from the ambient outdoor air using the heat pump 6. Air leaving the solar collector 1 may be at temperatures in the region of −8° C. to +15° C. The store temperature may be −10° C. to +10° C., that is to say at a temperature lower than that of the air from the solar collector 1. Heat is therefore given up to the heat store 2. Air leaving the heat store 2 and arriving at the heat pump evaporator 6a is typically at −10° C. to +10° C. Air leaving the heat pump condensor 6b is typically at 32° C. Thus, using the heat pump 6, it is possible to heat the house 3 even though the store temperature is well below the necessary 28° C. As the heating system continues to operate in this mode, the temperature of the store 2 drops as heat is continuously extracted. The co-efficient of performance (C.O.P.) of the heat pump 6, which can be as high as five, also drops as does the temperature to which air is heated by the heat pump condensor 6b. From a consideration of FIG. 1c it will be noted that the same charge of air is continuously circulated to the heat pump evaporator 6a in a closed air-tight circuit. Thus the evaporator 6a should not frost over. The heat pump 6 should not need to be defrosted and should therefore operate continuously at a relatively high C.O.P. The solar collector 1 acts as a secondary evaporator. Any frosting on the solar collector 1 is however spread over a much wider surface area than that of the heat pump evaporator 6a, and will in any case melt during the day time. To prevent ingress of outside air the ducting 10 must be leak proof. In practice, a small amount of air has been found to leak into and out of the ducting 10 if the heat pump 6 is operated continuously for a considerable length of time, such as may happen under certain unusual weather conditions. The heat pump evaporator 6a then does gradually frost over. An electrical conductivity probe (not shown) is provided adjacent to the evaporator 6a to detect when the frosting on the evaporator reaches a certain thickness. When too much frosting over has taken place the control system then operates to cause the heating system to switch to another mode in which warm air passes over the evaporator 6a and melts the frost. Alternatively, the heating system may be provided with an electric heater defrost (not shown).

Figure 1D:
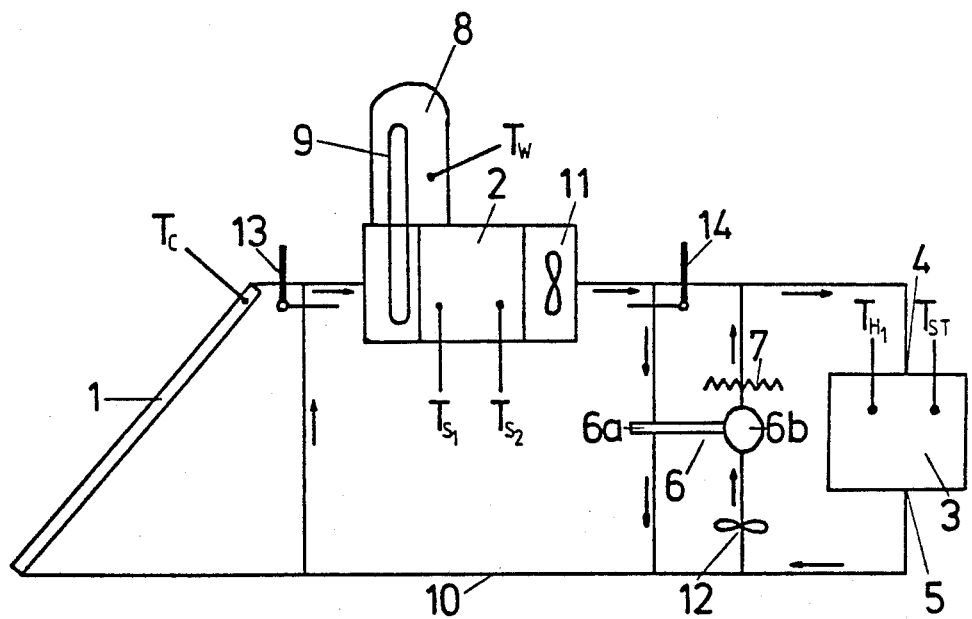

FIG. 1d shows a fourth mode in which heat is sent from the heat store 2 to the heat pump evaporator 6a and back to the heat store, without going through the solar collector 1. The fourth mode occurs under conditions similar to those for the third mode, except that air from the solar collector 1 is at a lower temperature than the heat store 2, and it is therefore not worthwhile driving air through the solar collector. As heat is extracted from the heat store 2, the temperature of the heat store gradually reduces. If the store temperature falls below the temperature of air obtained from the solar collector 1 the control system may switch the heating system back to the third mode. In the fourth mode the store 2 may be at temperatures between $-4°$ C. and $-15°$ C. The heat pump 6 operates at a low C.O.P, and consequently this mode cannot sustain the necessary heating of the house 3 for any prolonged period.

Figure 1E:
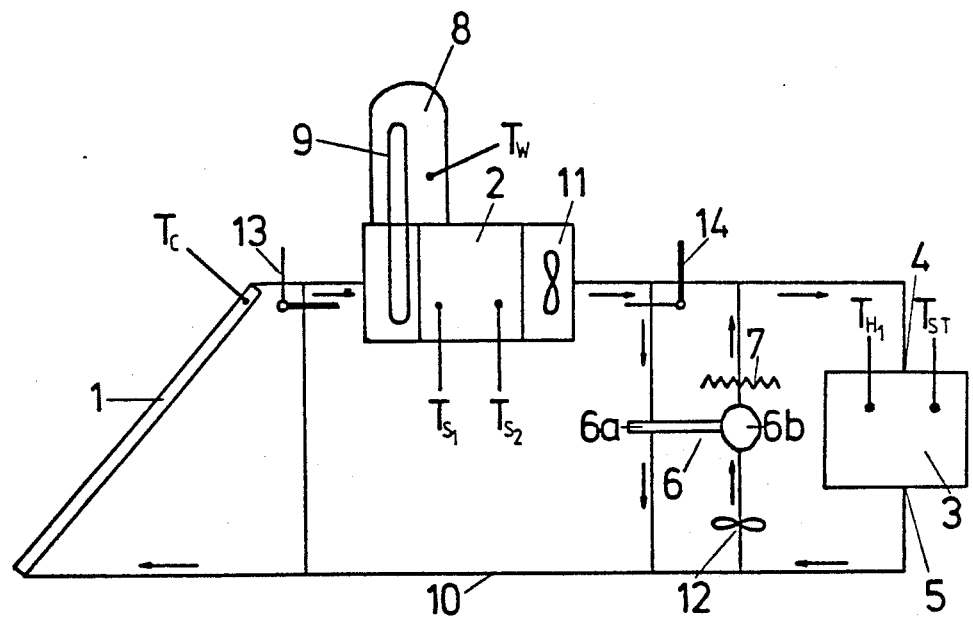

FIG. 1e shows a fifth mode in which air is sent from the solar collector 1 to the heat store 2 and to the heat pump evaporator 6a. The electric heating unit 7 is switched on. The heating unit 7 comprises a four kilowatt bank of electric heating elements. The fifth mode may occur frequently or be dominant on a mild Winter's night. The outdoor air temperature may be at, say, $-2°$ C. to $+2°$ C. Air leaving the store may be at about $-10°$ C. and may be cooled to $-15°$ C. as it passes across the evaporator 6a. The heat pump 6 operates at a relatively low C.O.P., the heat pump delivering about two to two and a half kilowatts, and the return air from the house at 20° C. is heated to just 28° C. as it passes across the heat pump condensor 6b. The electric heating unit 7 adds on an additional four kilowatts, raising the temperature of the air from 28° C. to about 38° C.

Figure 1F:
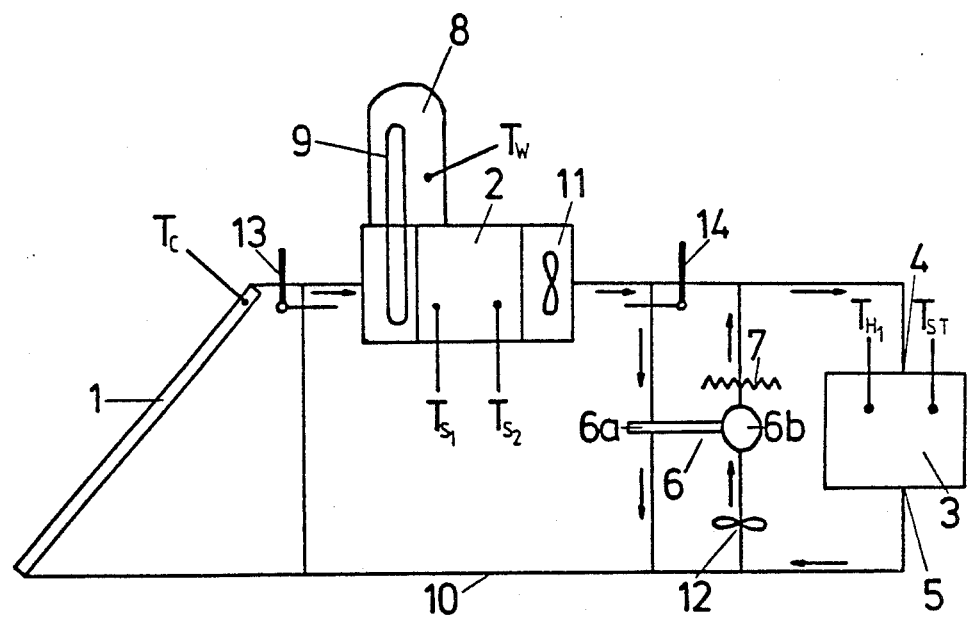

FIG. 1f shows a sixth mode in which air is sent from the heat store 2 to the heat pump evaporator 6a and directly back to the heat store 2, and the electric heating unit 7 is switched on. The sixth mode is similar to the fifth mode except that the store temperature is higher than the air temperature which can be obtained from the solar collector 1, and air from the heat pump evaporator 6a is therefore not sent to the solar collector 1.

Figure 1G:
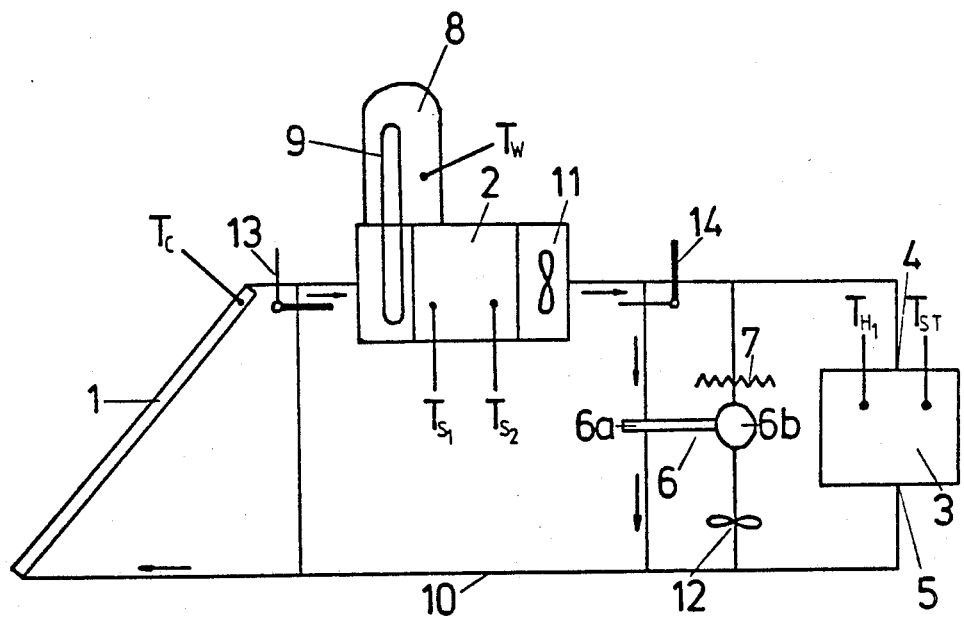

FIG. 1g shows a seventh mode in which air is sent from the solar collector 1 to the heat store 2 and back to the solar collector 1, the air collecting heat at the solar collector 1 and delivering the heat to the heat store 2. This mode occurs when the store temperature is lower than the air temperature available from the solar collector 1, and when no space heating is required. This situation may typically arise on a sunny day in Spring, Summer, or Autumn. The heat store 2 may absorb a lot of latent heat at its phase change temperature of 31° C., followed by absorption of sensible heat at higher temperatures. The temperature of the store 2 is limited, for safety reasons, to a maximum of 75° C., and accordingly the heating system leaves the seventh mode when the store reaches this maximum.

Figure 1H:
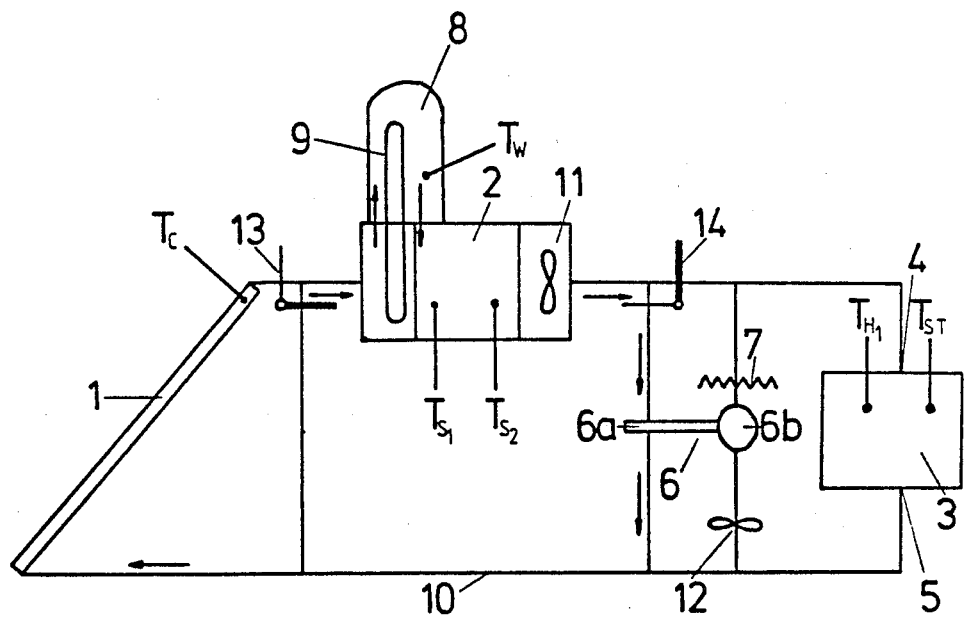

FIG. 1h shows an eighth mode. In the eighth mode, the space heating system operates in identical manner to the seventh mode. The temperature of the water in the hot water tank 8 is, however, lower than that of air coming from the collector 1, and consequently heat is given up to the thermosiphon 9. This mode may occur on a sunny day, allowing the store 2 to be heated up for subsequent night time space heating and simultaneously allowing water to be heated. Energy may be delivered to the hot water tank 8 at rates of up to eight kilowatts. It will be appreciated that the hot water tank 8 includes an electric immersion heating element (not shown) for heating water when heat is not available from the space heating system of the invention, for example during the Winter.

Figure 1I:
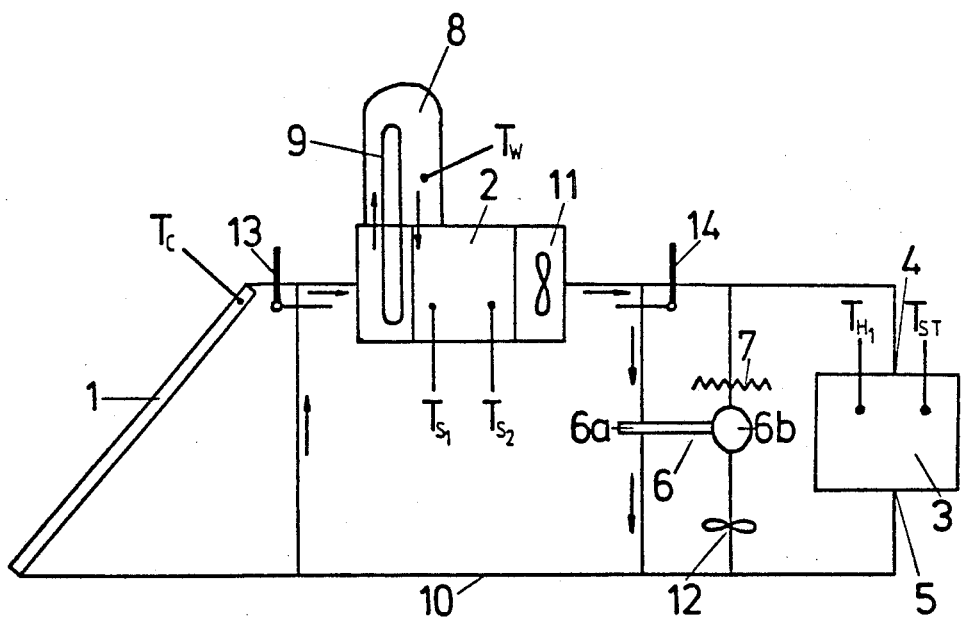

FIG. 1i shows a ninth mode. In the ninth mode, air is circulated from the heat store 2 to the thermosiphon 9 and then back to the heat store 2. This mode occurs when the temperature of the water in the hot water tank 8 drops due to use of hot water, and when the temperature of the store 2 is so high that there is sufficient heat to replenish the heat taken from the hot water tank 8 and so high that no heat can be obtained from the solar collector 1. This mode may typically arise on a Summer's night, after a sunny Summer's day.

Figure 1J:
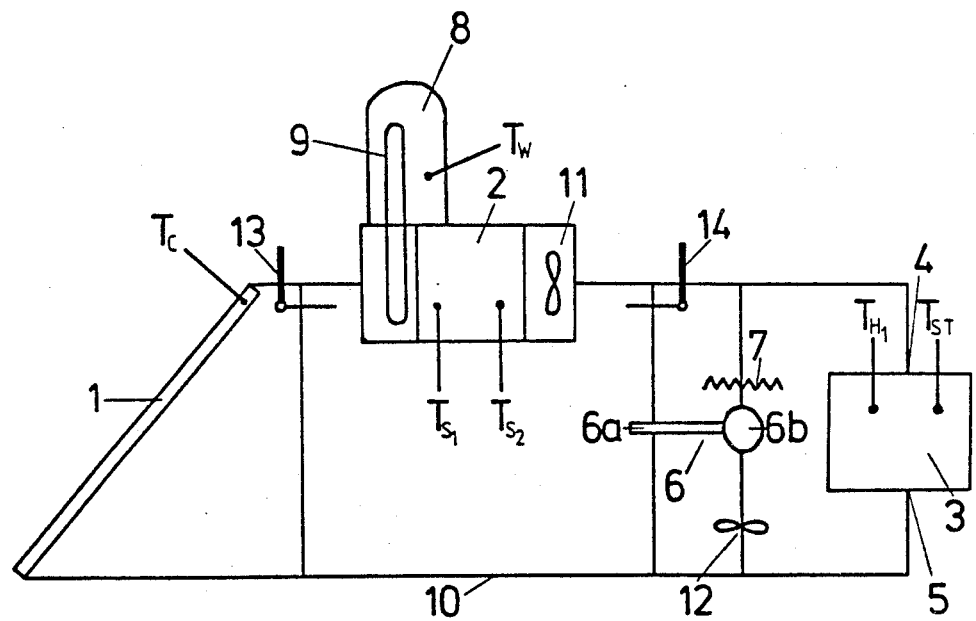

FIG. 1j shows a tenth mode, in which the heating system is idle. The dampers 13, 14 are in the positions shown so as to prevent heat gain at the heat store 2. This mode arises when no space heating is required and the heat store 2 and hot water have each been heated to the maximum desirable level. Such a situation may occur on a fine Summer's day.

It will be appreciated from the foregoing that one or both fans 11,12 are in operation and using electricity most of the time. In a house which is well designed and well insulated the heat pump 6 sometimes comes on, usually at night. The electric heating unit 7 comes on only very occasionally, almost always at night. When the electric loads come on at night, the consumer may benefit from reduced night rate electricity tariffs.

The electricity consumption of the fans 11, 12 is minimised by employing air ducting 10 of large cross section (as will be described in more detail below) thereby minimising the pressure head around the system and by employing variable speed fans which may be operated at different speeds depending on which route the air is being driven along. The first fan 11 is a three speed fan having a maximum rating of two hundred and fifty watts. The second fan 12 is a single speed fan having a rating of two hundred watts.

A further efficiency in electricity consumption arises in that the electrical components are contained within a single housing 15 (as will be described in more detail below) so that any heat generated in the operation of the fans 11,12 or the heat pump 6 goes to heating air in the heating system.

Figure 2:
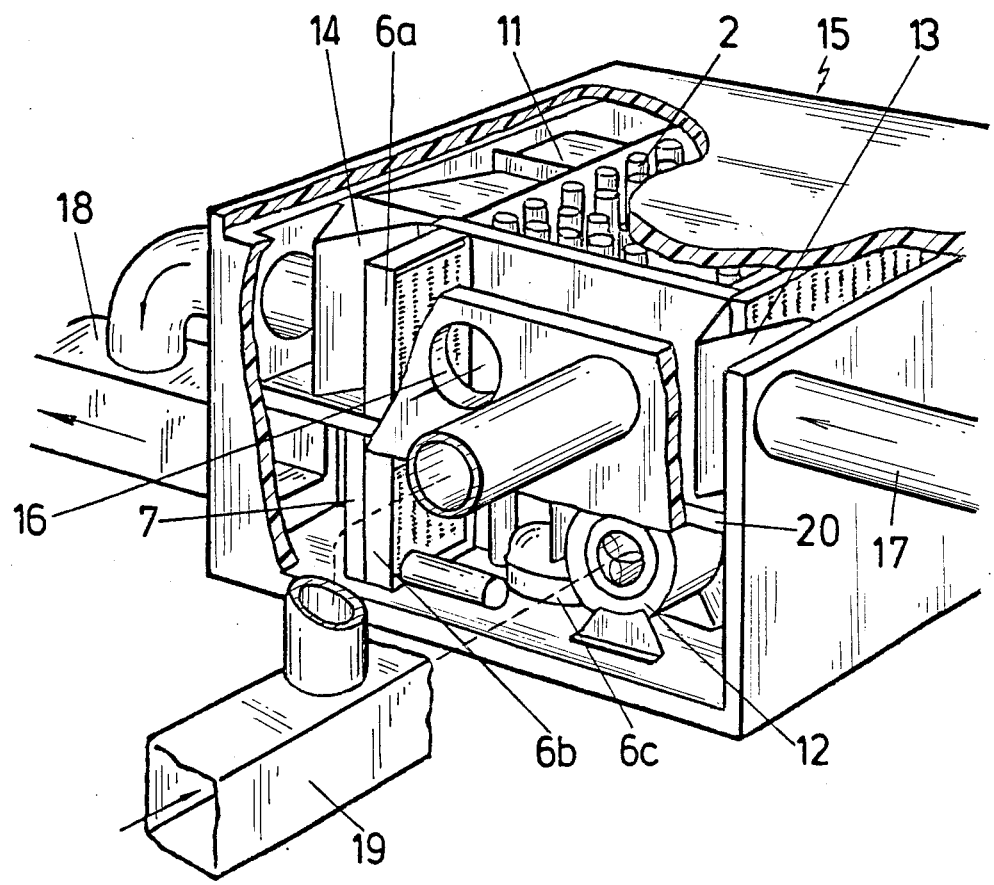
FIG. 2 is a perspective partially cut away view of a box or housing in which most of the system components are located.

Referring now to FIG. 2, there is shown the housing 15 containing most of the components of the heating system. The housing 15 is provided with ports or connections 16, 17, 18 and 19 for air flow to and from the solar collector 1 and to and from the house 3 respectively. The housing 15 is 1.6 meters long by 1.6 meters wide by 1.4 meters high. The housing 15 is made as a single moulding from high density polyurethane, and includes apertures in the side walls for the various connections and a larger aperture (not shown) on the top for allowing the components to be placed within the housing. The aperture at the top is closed by means of a lid with a silicone rubber seal. The housing 15 has a wall thickness of 65 to 70 mm, is lined with metallic foil to prevent ingress of water, and is encased in standard domestic grade plasterboard which is fire proof, deadens sound and can be painted to give a pleasing finish. The housing 15 and contents weigh about six hundred kilograms.

The housing 15 contains the heat store 2, which consists of an array of three hundred and fifty phase change tubes, each being 1.2 meters long and 38 mm in diameter, made by the Calor Company of Great Britain and sold under the trade mark CALORTHERM. Alternatively the heating system may employ water as a phase change material. The housing 15 also contains the heat pump 6 which is a 680 watt air-to-air heat pump having a rotary compressor 6c made by the Daikin Company of Japan. The condensor 6b, evaporator 6a and compressor 6c may be seen in FIG. 2. There may also be seen an air proof partition 20 which extends out from the region of the heat store 2 at mid-height within the housing 15 and thereby divides the remainder of the housing into an evaporator region and a condensor region. Also in the housing 15 are the first and second fans 11, 12, the first and second dampers 13, 14, and the electric heating unit 7. The electric motors for the dampers 13, 14 are omitted from FIG. 2 for clarity but are seated on top of the housing 15 at the outside thereof.

The hot water tank 8 is also omitted from FIG. 2 for clarity but is seated on top of the housing 15. The thermosiphon 9, also omitted from FIG. 2, consists of a closed loop containing glycol as a working fluid and comprises a heat exchanger within the housing 15 for collecting heat, a heat exchanger in the hot water tank 8 for yielding up the heat, and connections between the heat exchangers. The heat exchanger for collecting heat comprises a lower header for distributing cooler glycol, an upper header for collecting warmer glycol, and a number of vertical connecting pipes in which the glycol is warmed. The lower header is of larger cross section than the upper header, and both headers slope gradually upwards along the direction of travel of the glycol. Glycol is used because the air temperature in the housing 15 may fall below freezing. Alternatively, the thermosiphon 9 may employ water as a working fluid in which case it is made of polypropylene so as not to be damaged at temperatures below 0° C. Alternatively, heat may be transferred by means of a heat pipe.

Figure 3:
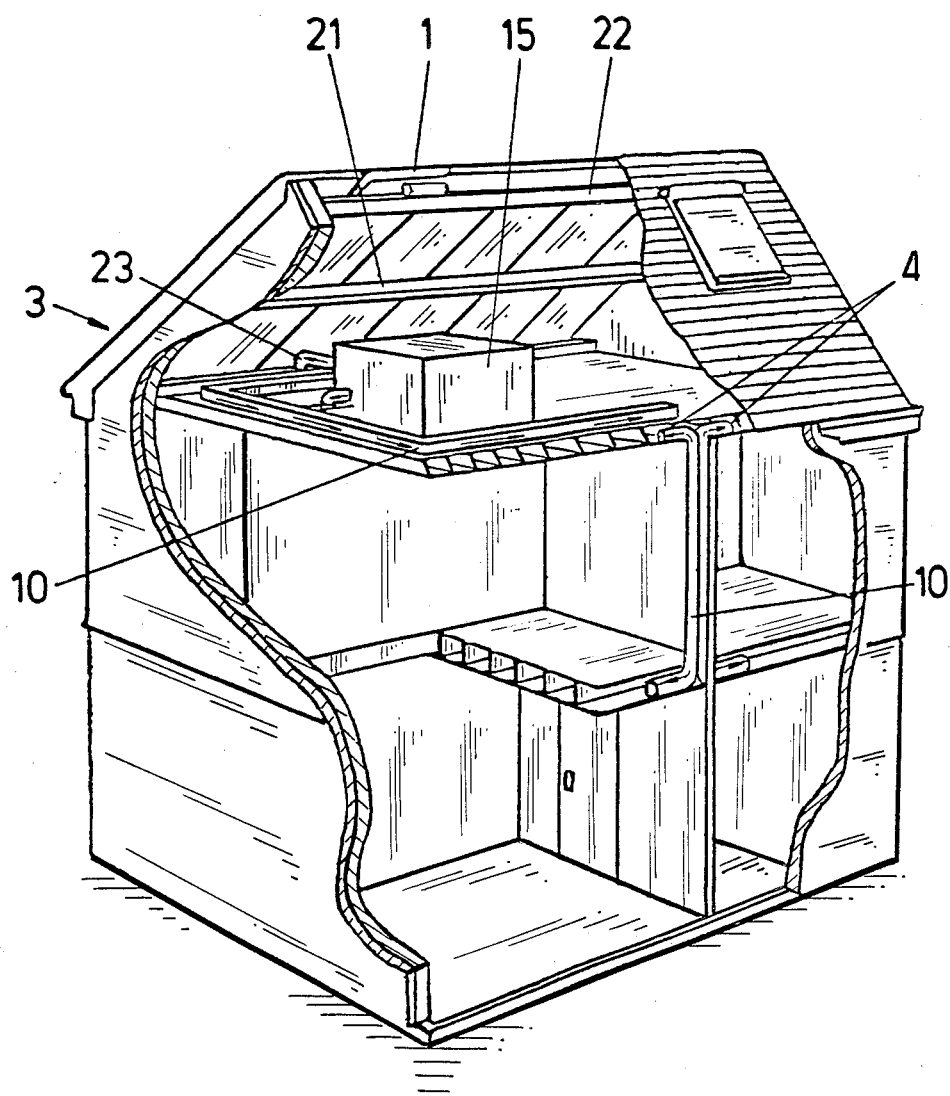
FIG. 3 is a perspective partially cut away view of a house including a heating system according to the invention.

FIG. 3 illustrates a conventional house 3 including a heating system according to the invention. The roof is made of panel and purlin construction to give a clear attic. The South facing slope of the roof (the far side as seen in FIG. 3) consists of a number of air cooled solar panels 1 supported by purlins 21. The North facing slope of the roof (the near side as seen in FIG. 3) is tiled. An air collector manifold 22 is provided for bringing air from the upper ends of the solar collectors 1 to the housing 15. The ducting 10 includes an air distribution manifold 23 for returning air from the housing 15 to the lower ends of the solar panels 1. Ducting 10 is also provided for distributing warm air from the housing 15 to the various rooms of the house 3. Similar ducting (not shown in FIG. 3) is provided for collecting return air from the various rooms and bringing the return air to the housing 15.

The air ducting 10 is made from similar material to the housing 15, that is from polyurethane lined with metallic foil and encased in plasterboard. The network is constructed on site from straight lengths and angled lengths. These lengths are manufactured by injection moulding and are seamless which greatly reduces leakage of air in an out of the ducting 10. They are cut to suitable lengths and jointed. The ducting 10 is square in cross section and has an internal dimension of 300 mm and an external dimension of 374 mm.

The householder controls the system by means of a controller/thermostat unit. The controller/thermostat unit allows the householder to switch the system on or off, set the desired indoor temperature $T_{st}$, and switch the electric heating unit 7 on and off.

We claim:

1. A unit for a ducted, air space heating system powered by an air cooled solar collector, comprising:
   (a) a thermally insulated, airtight housing;
   (b) a plurality of first air ducts leading to and from the solar collector;
   (c) at least one first air outlet from and at least one first air inlet to the housing, which are connectable to and disconnectable from the first air ducts;
   (d) a plurality of second air ducts leading to and from the space to be heated;
   (e) at least one second air inlet to the housing, which are connectable to and disconnectable from the second air ducts;
   (f) a heat store within the housing;
   (g) an air-to-air heat pump in the housing for supplementing the heat provided by the solar collector, the heat pump comprising an evaporator and a condenser, an air-tight partition within the housing separating the heat pump evaporator from the heat pump condenser;
   (h) valve means in the housing, operable to direct air passing through the housing and divide the space heating system into a plurality of air flow paths;
   (i) a plurality of forced draught mechanisms within the housing operable to drive air along the selected air flow paths; and
   (j) a control system for controlling the operation of the heat pump, the draught mechanisms and the valve means so as to operate the space heating system to move air along selected air flow paths, wherein the air flow paths include
   a first air flow path in which the heat pump, the forced draught mechanisms, and the valve means are operated such that air flows along the first air flow path, the first air flow path extending from the heat pump evaporator to at least one of the solar collector and the heat store for the air to collect heat and then back to the heat pump evaporator for the air to yield up heat in the heat pump evaporator, and wherein substantially the same mass of air is continuously recirculated along the first air flow path; and
   a second air flow path in which the heat pump, the forced draught mechanisms, and the valve means are operated such that air flows along the second air flow path, the second air flow path extending from the heat pump condenser to the space to be heated where the air yields up heat and then back to the heat pump condenser where the air collects further heat.

2. A unit according to claim 9, further including an electric heating element located in the housing in the second flow path, the heating element being connected to and operable under the control of the control system, to supplement the heat output from the heat pump condenser.

3. A unit according to claim 1, further including a hot water tank for containing hot water, a heat exchanger extending from within the housing to the tank, for transferring heat from the housing to water in the hot water tank.

4. A unit according to claim 1, in which the heat store comprises a material which changes between the solid and liquid phases at a temperature slightly above the temperature which is normally demanded in the space being heated.

5. A unit according to claim 1, in which the first and second air inlets and first and second air outlets are of relatively large cross section to allow connection of air ducts of large cross section thereto.

6. A unit according to claim 1, in which the thermally insulated airtight housing is made from a foamed plastic material and is provided with a vapor-proof lining.

7. A unit according to claim 1, wherein the forced draught mechanisms are located in the thermally insulated, airtight housing.

8. A unit according to claim 1, wherein the ducts are made from a foamed plastic material and are provided with a vapor-proof lining.

9. A unit according to claim 1, further including an electrical conductivity probe adjacent to the evaporator to detect when the frost on the evaporator reaches a certain thickness.

10. A unit according to claim 9, wherein the control system is operated, when the electrical conductivity probe detects that frost on the evaporator has reached a certain thickness, to move air along a selected air flow path, wherein the selected air flow path moves warm air over the evaporator and melts the frost.

11. A unit according to claim 1, further including an electric heater defroster.

* * * * *